UNITED STATES PATENT OFFICE.

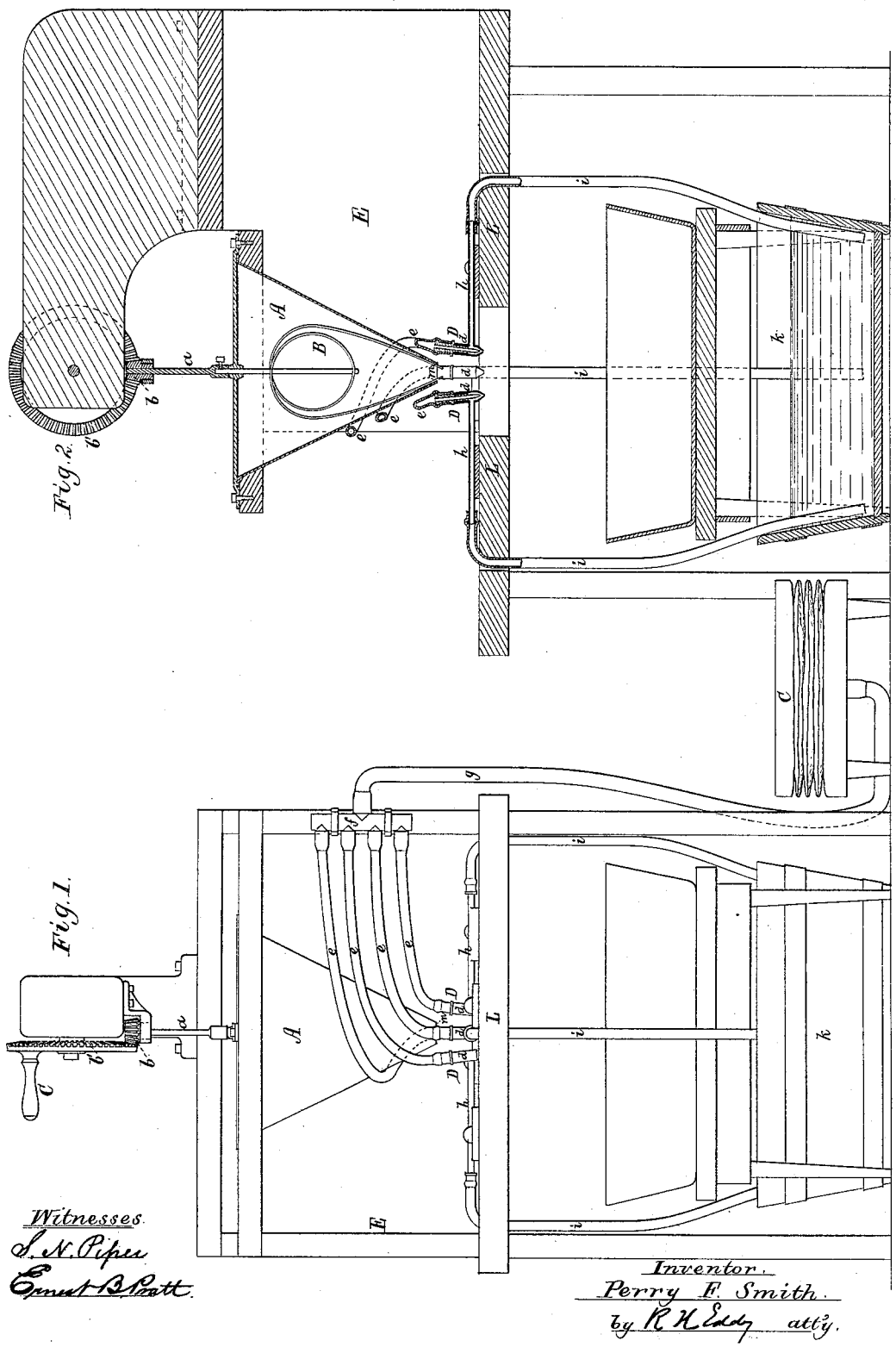

PERRY F. SMITH, OF BOSTON, MASSACHUSETTS.

MECHANISM FOR CONVERTING FLOUR INTO DOUGH.

SPECIFICATION forming part of Letters Patent No. 332,017, dated December 8, 1885.

Application filed March 30, 1885. Serial No. 160,655. (No model.)

*To all whom it may concern:*

Be it known that I, PERRY FIFIELD SMITH, of Boston, in the county of Suffolk, of the Commonwealth of Massachusetts, have invented a new and useful Improvement in Means or Mechanism for Converting Flour into Dough; and I do hereby declare the same to be described in the following specification and represented in the accompanying drawings, of which—

Figure 1 is a front elevation, and Fig. 2 a longitudinal section, of a machine of my invention, the nature of which is defined in the claim hereinafter presented.

By my mode or process of treating flour by the mechanism herein described a mass of it is to be beaten and stirred so as to separate its particles from one another, and while they are so separated they are subjected to the action of air and vapor or spray in a manner to cause them, when falling or coming again together, to form a spongy mass of dough.

In the drawings, A denotes a hopper having within it a rotary agitator or stirrer, B, having on its shaft $a$ a bevel-pinion, $b$, to engage with a bevel-gear, $b'$, suitably supported and furnished with a crank, $c$, for revolving it. Below the educt $m$ of the hopper are four or other suitable number of atomizers, D, whose air-vents $d$ have tubes $e$ extending from them to and opening into a single tube, $f$, closed at its ends, and at its middle opening into the eduction-pipe $g$ of a bellows, C. Each of such vents is fixed to the end of and opens into a jet-tube, $h$, from which an induct or tube, $i$, leads into a tub or reservoir, $k$, containing water. The atomizers are supported on the base $l$ of a frame, E, that supports the hopper and the mechanism for operating the agitator therein.

In using the said machine the hopper is to be charged with flour, or flour is to be allowed to fall into it, and after having been stirred by the agitator it is to be discharged from the hopper in a stream between the vents $d$ of the atomizers. The particles of flour in passing or falling in a divided state between the atomizers will there be subjected to the action of the currents of air and spray discharged from their vents directly upon such particles, such currents passing downward into and with the descending particles, which in their fall will be wet or moistened by the spray, and in coming together upon a platform or in a suitable receptacle will form a spongy mass, or be converted into dough fit for being baked for conversion into bread.

I do not herein claim the method or process described of treating flour for converting it into dough, such being the subject of a separate application which I have made; but the process hereinbefore described, is the subject of an application for a patent filed by me on May 20, 1885, and bearing the Serial number 166,207.

I claim as my invention—

The combination of the hopper and its agitator, having mechanism for revolving it, as described, with four or other suitable number of atomizers arranged immediately below the educt of such hopper, and provided with means of forcing air through their vents and of supplying water thereto, whereby when the hopper is charged with flour and such flour is stirred by the agitator and caused to fall in a divided state from the hopper the particles of such flour shall be subjected to downward currents of air and spray or vapor thrown upon them by the atomizers, all being so as to cause such particles on falling together to be reduced to a spongy mass or dough, as set forth.

PERRY F. SMITH.

Witnesses:
R. H. EDDY,
ERNEST B. PRATT.